United States Patent

[11] 3,542,387

[72] Inventor Leopold F. Schmid
     Stuttgart, Germany
[21] Appl. No. 739,605
[22] Filed May 13, 1968
     Division of Ser. No. 564,149, July 11, 1966, now Pat. No. 3,414,278
[45] Patented Nov. 24, 1970
[73] Assignee Firma Alfred Teves G.m.b.H.,
     Frankfurt am Main, Germany,
     a corporation of Germany
[32] Priority Aug. 2, 1965
[33] Germany
[31] No. C37-486
     Ser. No. 739,605

[54] BODY-POSITIONING SUSPENSION SYSTEM FOR AUTOMOTIVE VEHICLES
     2 Claims, 5 Drawing Figs.
[52] U.S. Cl. .................................................. 280/6,
                                                         280/124

[51] Int. Cl. ..................................................... B60g 17/00
[50] Field of Search ......................................... 280/124, 6;
                                                                 267/8

[56]            References Cited
           UNITED STATES PATENTS
2,999,694  9/1961  Allison .......................... 280/124X
3,049,359  8/1962  Geyer ............................ 280/124
3,150,867  9/1964  Droegkamp ................... 267/8

Primary Examiner—Philip Goodman
Attorney—Karl J. Ross

ABSTRACT: A self-leveling suspension device is located between the differential housing of a rigid axle structure and the chassis along the longitudinal axis of the vehicle while spring suspensions are disposed symmetrically on opposite sides thereof.

LEOPOLD FRANZ SCHMID
INVENTOR.

BY
Karl G. Ross
Attorney

LEOPOLD FRANZ SCHMID
INVENTOR.

BY
Karl F. Ross
Attorney

BODY-POSITIONING SUSPENSION SYSTEM FOR AUTOMOTIVE VEHICLES

This application is a division of U.S. Pat. application Ser. No. 564,149 filed 11 July 1966, now U.S. Pat. No. 3,414,278.

My present invention relates to a suspension system for automotive vehicles capable of readjusting the body level with respect to the axle assembly or assemblies to compensate for changes in the loading of the resilient suspension members.

In my U.S. Pat. application Ser. No. 508,517, now U.S. Pat. No. 3,376,032, filed 18 Nov. 1965 and in the commonly assigned U.S. Pat. applications Ser. No. 500,574 now U.S. Pat. No. 3,353,813 of 22 Oct. 1965 and Ser. No. 557,220 now U.S. Pat. No. 3,385,589 filed 13 June 1966 by Hans Erdmann and entitled Vehicular Suspension System, there are described shock absorbers for vehicular suspension systems of the load-leveling type wherein a direct-action shock absorber, coupled between the vehicle body and an axle assembly, cooperates with one or more resilient members (*e.g.*, coil springs) and is provided with a pumping mechanism operable during the oscillations resulting from vehicular movement to jack up the vehicle body with respect to the suspension springs and load the latter in accordance with the weight of the body. In this arrangement, therefore, the vehicle body may be readjusted to a predetermined level while the compression springs or like suspension members are stressed to a corresponding degree and may even be highly compressed or deflected without causing the vehicle body to assume a lower position because of such loading. As a practical matter, the mechanism makes use of an auxiliary hydraulic cylinder disposed between the upper spring seat and the vehicle body to vary the distance between the upper spring seat and the body as a resulting of pumping action within the shock-absorber cylinder. In general, the hydraulic jacking devices used for this purpose may be considered to be a servomotor operable in response to deviations in the body position and actuated by a pumping mechanism to reassume the original body level. The servomechanism may then include a level-determining means which renders the hydraulic pumping system effective when the vehicle-body level is lowered beyond a predetermined point to jack up the body with respect to the upper seat of the spring or to drain the hydraulic cylinder when, as a result of unloading of the vehicle body, the latter tends to rise above a predetermined point.

While such devices have been proposed heretofore and are generally described in the aforementioned patent application, several difficulties have been encountered because of the complexity of such systems, the proportionally large length thereof, and problems arising because of leakage of hydraulic fluid from the auxiliary hydraulic means for adjusting the body level. Thus it will be understood that low-hung automotive vehicles cannot readily accept long double-acting shock-absorber members of conventional character which are additionally provided with body-lifting means, while any leakage of hydraulic fluid from the body-positioning hydraulic jack will cause the body level to lower during prolonged periods of stand.

It is, accordingly, the principal object of the present invention to provide an improved device for the level-regulation of automotive-vehicle bodies which uses a reduced number of functioning parts, is of simple manufacture and assembly, is easy to repair and is relatively robust so that it can withstand prolonged and hard use.

A further object of this invention is to provide an improved load-leveling system of the general character described which is significantly more compact then conventional devices and has considerably high accuracy without sustaining body lowering during long periods of stand.

These objects and others which will become apparent hereinafter are attained, in accordance with present invention, with a compact unitary device (mountable as a unit between an axle assembly and the vehicle body) consisting of a pumping device, a hydraulic body-lifting jack, a spring means (*e.g.*, a coil-type compression spring), and spring seats; the reservoir for the hydraulic medium is longitudinally shiftable codirectionally with the resilient means and advantageously connected with one of the spring seats (*i.e.*, the lower spring plate) so that it follows the upward and downward movement of the respective seat.

According to another feature of this invention, the hydraulic device for positioning the vehicle body with respect to the upper spring seat or plate comprises a piston which is received in a hydraulic cylinder at the upper end of the assembly and is provided with a downwardly extending shaft whose lower end is immersed in and extends below the surface of the hydraulic fluid in the supply receptacle connected to the lower spring plate; in the lower end of this shaft, which is provided with a central bore for the passage of the hydraulic fluid, I have found it advantageous to mount a check valve blocking the outflow from the central bore and the hydraulic chamber of the hydraulic device but permitting the influx of hydraulic fluid into this central bore. The check valve thus constitutes a suction valve or intake valve of the pumping means. The central bore of this shaft of the piston is, moreover, provided with valve means blocking communication between the working chamber of the hydraulic device and the reservoir as long as the vehicle body remains below its predetermined body height under, for example, heavy loading. The tight blockings of the valve is advantageously sustained by means of a preloaded (*i.e.*, prestressed) spring upon which the pump plunger acts. The latter is axially shiftable within the shaft of the piston for displacing the hydraulic fluid from the reservoir past a further check valve into the working chamber of the hydraulic device. The pump plunger may, moreover, be tubular and formed with an open end confronting the floor of the liquid receptacle and engageable with a resilient abutment at this floor upon settling of the vehicle body during oscillation of the body with respect to the axle assembly to close the pump plunger and permit it to displace hydraulic fluid to the body-lifting device during such oscillation.

According to another aspect of this invention, the hydraulic assembly forms part of a vehicle suspension having a relatively rigid rear-axle assembly and is disposed substantially at the median plane passing longitudinally through the vehicle. Thus the body-positioning device is preferably mounted upon the rear-axle assembly at the differential housing and rearwardly thereof. This arrangement has the advantage that only a single load-leveling device is required for rear-axle repositioning of the vehicle body; the additional spring means of the body-positioning device modifies the spring characteristics of the suspension so as to constitute between 25 and 40 percent of the total suspension-spring force. It has been found that this arrangement yields the same advantage with rigid axle assemblies as has been obtainable heretofore only with full-floating or swingable axles (independent wheel suspensions).

Thus it can be noted that the live axle assembly of the rear wheels, which may be a rigid power-transmitting axle arrangement coupled with the differential, generally has a center of vertical oscillation or a "transient" or instantaneous center lying approximately at the level of the wheel center whereas the independently suspended front wheel assemblies can be considered to have transient or instantaneous centers somewhat therebelow and usually only several centimeters above the road surface. The oscillations are judged in terms of the rear-contacting surface of the wheels. Because of the lowering of the transient or instantaneous center of the rigid rear-wheel axle assembly with the aid of the body-positioning suspension of the present invention, the so-called transient axis or instantaneous axis extending longitudinally of the vehicle and constituting an imaginary line connecting the instantaneous centers of oscillation of the front and rear wheels can be of reduced inclination, a result which has been obtainable heretofore only by avoiding the use of rigid live axle assemblies at the rear wheels and employing floating or swingable axle arrangements.

The above and other objects, features and advantages of the present invention will become more readily apparent from the following description, reference being made to the accompanying drawing in which.

Figure 1:
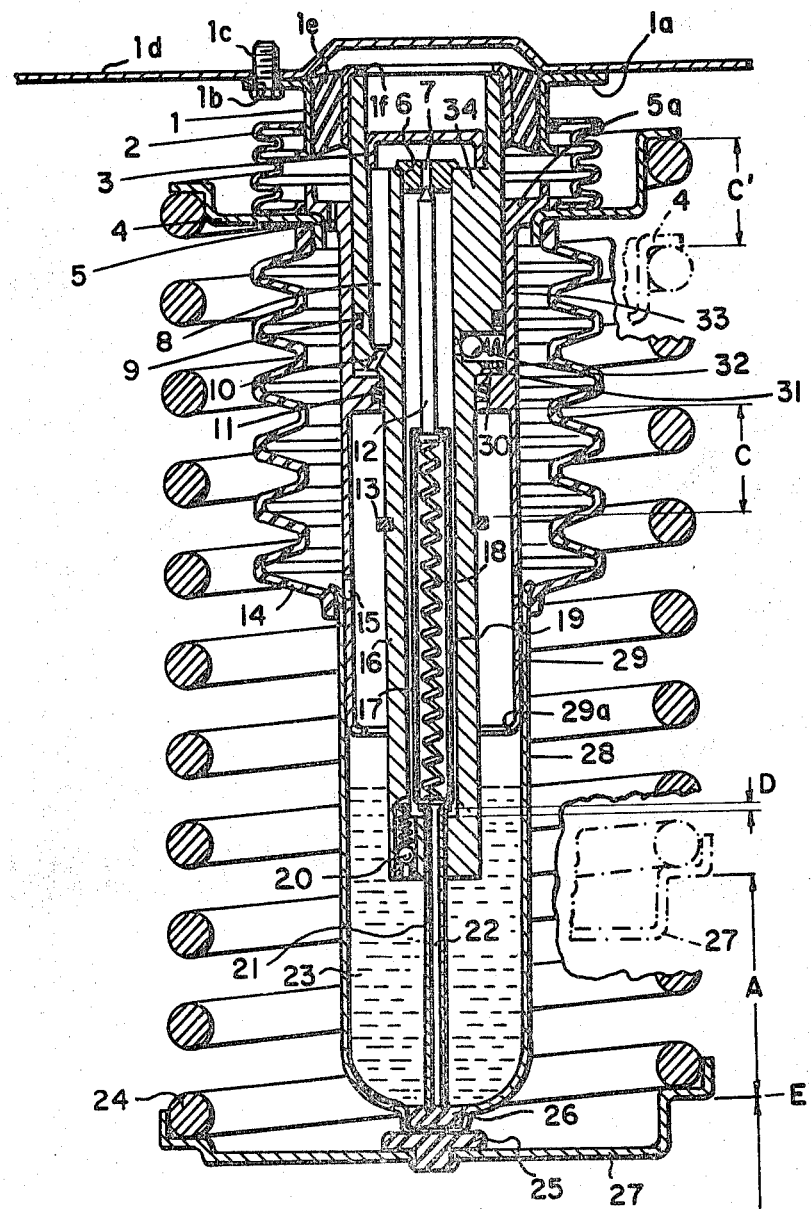
FIG. 1 is an axial cross-sectional view showing a body-positioning suspension device adapted to be inserted between an axle assembly and a vehicle body in accordance with the present invention.

Referring first to FIG. 1, it will be seen that the body-positioning suspension device in accordance with the present invention comprises a unit which is complete in itself and may be mounted between the vehicle body and axle assembly of any existing vehicle to augment the usual suspension system or to provide load leveling and body-repositioning facilities for a vehicle not originally having same. It will also be understood that the device may constitute "original equipment" in newly constructed vehicles in which case the additional spring force contributed by the device is taken into consideration in determining the total spring support for the vehicle body. Basically, the device comprises a support sleeve 1 whose flange 1a is provided with angularly equispaced bores 1b through which bolts 1c can be inserted to secure the upper end of the device to the vehicle body which is represented by a sheet-metal wall or plate 1d. A vibration absorbing buffer ring of elastomeric material is disposed at 1e inwardly of the sleeve 1 to cushion the junction of the body-lifting means therewith. A cap 1f is bonded to the cushion 1e which, in turn, is bonded to the sleeve 1 so that axial forces may be transmitted between the cap 1f and the sleeve 1.

A piston 34 of the body-lifting hydraulic means (e.g., hydraulic jack) bears axially upon an inwardly turned flange of the cap 1f and thus can transmit upward forces to the vehicle body. The piston 34 is axially slidable in a cylinder 33 which defines therewith a working chamber 31 at the underside of the piston 34. Thus, when hydraulic fluid is pumped into the chamber 31, the piston 34 will rise relatively to the cylinder 33, and lift the vehicle body 1d with respect to the upper spring plate 4. Between the cylinder 33 and the sleeve 1, I provide a corrugated flexible rubber cuff or boot 2 to prevent entry of contaminants into the hydraulic device. The upper spring plate 4 bears against an outwardly extending flange 5a of the cylinder 33 and this flange is formed with a vent 5 communicating between the interior of cuff 2 and the interior of a boot 14 which prevents contaminants from passing into the hydraulic reservoir 28.

A check valve 32 communicates between a central bore 19 in the downwardly extending integral shaft 16 of the piston 34 and thus permits unidirectional flow of hydraulic fluid, during pumping action, past this check valve, and a bore 30 into the working chamber 31 of the hydraulic body-positioning means. Hydraulic fluid can be bled from this chamber via a constricted passage 10 and an axially extending bore 8 formed in the piston 34. A cap 3, forced into the axially open upper end of piston 34, diverts hydraulic fluid from the bore 8 to a valve means formed by a valve seat 6 at the upper end of the bore 10. The valve member or stem 12, which establishes the predetermined normal body height, bears axially against the seat 6 to block the aperture 7 thereof.

The suspension spring 24 of the unitary device is captive between the upper valve plate 4 and a lower valve plate 27 by means of which the lower end of the system can be mounted upon the axle assembly. The cylindrical fluid reservoir 28, which slidably receives the downwardly extending lower end 29 of the hydraulic cylinder 33, is affixed to the lower spring plate 27 via a rubber noise buffer 25 and is formed with a sealing block 26 of elastomeric material. The shaft 16 of the piston 34 extends into the body 23 of hydraulic fluid within the reservoir 28 and is formed at its lower end with an intake-type check valve 20 communicating with the central bore 19 of the shaft. In addition, the central bore 19 slidably receives a pumping plunger 21 whose central bore 22 normally opens into the body of hydraulic fluid 23 in an extended condition of the device but may be blocked in a contracted position by engagement of the plunger 22 with the sealing block 26. A spring cage 17 retains a coil spring 18 under prestress (i.e., precompression) within the bore 19 but defines a clearance therein to permit the throughflow of hydraulic fluid. The sleeve or cage 17 bears axially upon the plunger 21 and is perforated to permit the flow of hydraulic fluid from bore 22 into bore 19 and thence past the check valve 32 into chamber 31. In its fully extended state, the spring 18 urges the valve stem 12, which is slidably received in the cage 17, into valve-blocking engagement with the seat 6.

Since no road surface is absolutely flat, the axle assembly to which the lower spring plate 27 is secured, will oscillate in vertical direction with respect to the vehicle body represented at 1d. The reservoir 28 thus follows this alternate upward and downward movement either at the frequency of oscillation of the vehicle body (generally between 60 and 100 oscillations per minute for the passenger-type vehicle) or with the somewhat more rapid oscillations of the wheels or axle. If the vehicle body, because of loading or the like, is below its predetermined level, these oscillations will cause the pump plunger 21 to abut the sealing block 26 and, with further contractive movement of the upper and lower ends of the device, will displace hydraulic fluid within the bore 19 past the check valve 32 into the hydraulic cylinder 31 to raise the piston 35 with respect to the spring seat 4. During the reverse stroke at each oscillation of the reservoir 28, the spring 18 urges the plunger 21 downwardly and permits refilling of the bore 19 either via the passage 22 or via the check valve 20 so that the next contractive stroke will again displace hydraulic fluid to the chamber 31. It will be understood that the sealing block 26 may be replaced by any means designed to close the passage 22 upon contraction of the device and may be replaced, in accordance with the principles of this invention, by an upwardly tapering conical pin adapted to enter the passage 22 just as the stem 12 of the valve means enters the passage 7. The pumping action, which is carried on continually during movement of the vehicle over the road surface, gradually lifts the vehicle body to its predetermined level. When this level is attained, the plunger 21 is lifted from the sealing means 26 so that no further relative displacement of the plunger 21 and the shaft 16 is experienced.

Since the spring 18 is precompressed and captive within the shell 17, the displacement of the body level upwardly beyond the predetermined point permits the cage 17 and the valve stem 12 to move through the clearance D under the force of the hydraulic fluid within chamber 31 and unblock the passage 7. Hydraulic fluid is thus drained from the chamber 31 via the constriction 10 at axial bore 8, the chamber below cap 3, the passage 7, the bore 19 and the interior 22 of the pump plunger 21 into the reservoir 28 while the vehicle body settles with respect to the upper spring seat 4 to the predetermined body level. At this point, the plunger 21 engages the body 26 and retains the spring cage 17 to apply higher spring force against the stem 12 and bias it into blocking engagement with the seat 6. During stand of the vehicle, of course, this static state is retained until the vehicle is unloaded, whereupon draining in the manner described is effected until the desired body level is again attained. When the vehicle is loaded after a period of stand, operation thereof is required to institute the pumping action.

At maximum loading, the coil spring 24 is compressed through a distance C' with reference to its original position and the pumping arrangement 21 etc. serves to raise the piston 34 with respect to the cylinder 33 through a corresponding distance to maintain the height of the body at the desired level. The cylindrical receptacle 28, serving as a hydraulic-fluid reservoir, receives slidably the tubular portion 29 of the cylinder 33 while this tubular portion is open at 29a to permit any leakage fluid passing the seal 9 to flow through the bores 5 and 15 into the body of fluid 23 within the receptacle. In addition, leakage fluid passing the seal 11 flows through the interior of the tubular portion 29 and its open mouth 29a back to the reservoir. A split spring ring 13 is seated in an annular recess of the shaft 16 and is engageable with the underside 33a of the cylinder 33 to form a stop defining the maximum extension C of the hydraulic assembly 33, 34.

At A, I designate the maximum upward stroke of the valve plate 27 during contraction of the device and corresponding to upward movements of the axle assembly with respect to the vehicle body. The downward stroke of the valve plate 27 during alternate halves of the oscillation cycle is represented at B and represents the maximum extension of the suspension system from the transient center position represented at E of the device; this transient center position E will, of course, correspond to a transient center of the wheel assembly as will be apparent hereinafter.

Figure 2:
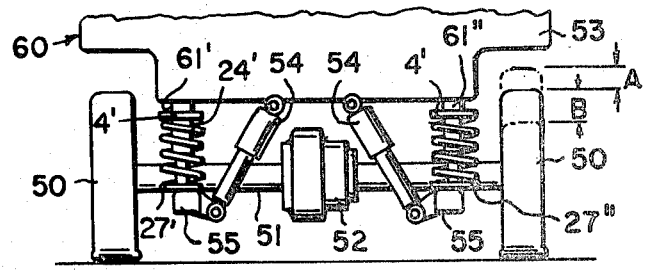
FIG. 2 is a rear end view of a vehicle diagrammatically showing the positioning of a pair of suspension devices in accordance with the present invention.

In FIG. 2, I show the relative positions of the rear wheels 50 of an automotive vehicle 60 in positions corresponding to displacements A and B. The wheels 50 are carried by a conventional rigid live-axle assembly 51 having a differential 52 as part of its power train. The vehicle body 53 may be mounted upon conventional live springs or coil springs (not shown) upon the axle assemblies and is further connected therethrough by direct action double-acting shock absorbers 54 shown here in diagrammatic form to be pivotally connected to the vehicle body and respective mounts 55 symmetrically disposed on the axle assembly 51 at opposite sides of the differential 52.

A pair of body-positioning devices of the type illustrated in FIG. 1 are shown at 61' and 61", on opposite sides of the differential housing 52, to be interposed between the body 53 and the respective pedestals 55. The springs 24' and 24" of those body-positioning devices are captive between the respective plates 4', 27' and 4", 27" so that they may be mounted with the remainder of the body-positioning device upon the vehicle. The system, of course, operates in the manner previously described.

Figure 3:
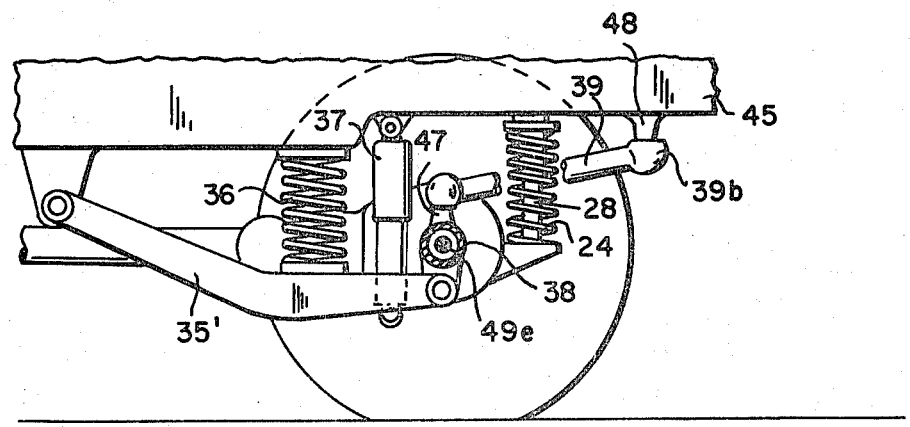
FIG. 3 is a side elevational view, partly in cross section, through the axle assembly of a live rigid rear-axle arrangement embodying the device of the present invention.
Figures 4, 5:
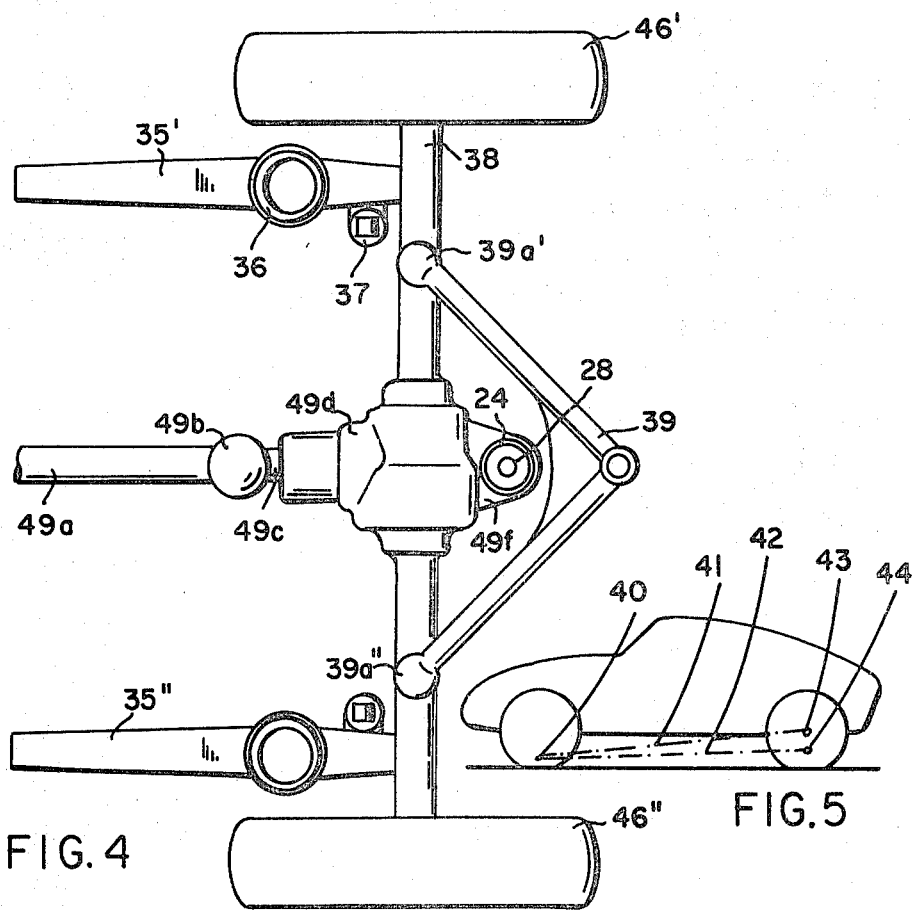
FIG. 4 is a plan view of the axle assembly (the vehicle body having been removed), diagrammatically illustrating other features of the invention.
FIG. 5 is a side elevational view of a passenger-type automotive vehicle illustrating how the transient or instantaneous axis of the suspension is modified in accordance with the principles of the present invention.

In FIGS. 3 and 4, I show another rigid rear-axle suspension system in accordance with the present invention, the rear axle being designated at 38 and being pivotally connected with the vehicle body 45 via a pair of bars 35' and 35" proximal to the wheels 46', 46" of the axle assembly. A further pivotal link 39 is of triangular configuration and is formed with ball sockets 39a', 39a" respectively engaging ball-shaped studs (one of which is shown at 47) and a further ball socket 39b engaging a ball headed stud 48 of the body 45. Thus the rear-axle assembly 38 is mounted with freedom of vertical movement with respect to the body 45. The power train includes a drive shaft 49a connected by a universal joint 49b with the input shaft 49c of a differential 49d whose output gears are coupled to the axle shafts of the wheels, one axle shaft being illustrated at 49b. A pedestal 49f extends rearwardly from the housing of differential 49d and carries the lower end of a body-positioning device whose spring can be seen at 24 in FIGS. 3 and 4 and whose cylindrical reservoir is shown at 28. The remainder of the suspension system includes a pair of conventional coil-type compression springs 36 interposed between each of the bars 35', 35" and the vehicle body 45, and a pair of oscillation-damping shock absorbers 37 of the direct acting type. The coil springs 36 carry between 60 and 75 percent of the body load applied to the rear-axle assembly with the balance being carried by the coil spring 24 of the body-lifting device. The latter is, as best seen in FIG. 4, disposed along the vertical longitudinal median plane of the vehicle.

From FIG. 5, it can be seen that the transient center 40 of the vertically oscillating front wheels lies just slightly above the load surface whereas the transient center 43 of the bottom of the rear wheels of a conventional suspension system lies substantially at the center of the wheel. Thus the transient axis 41 of a conventional vehicle is relatively steep and the entire vehicle is subjected to nonuniform oscillation. The auxiliary spring 24 has the effect of lowering the transient center of the rear-wheel assembly to the position designated at 44 so that, even for a rigid rear-axle system the transient centers of oscillation of the corresponding portions of the front and rear wheels are at approximately the same height above the load surface. The transient axis of the entire vehicle suspension, shown at 42, becomes almost parallel to the road surface and is only slightly thereabove.

The invention described and illustrated is believed to admit of many modifications within the ability of persons skilled in the art, all such modifications being considered within the spirit and scope of the appended claims.

I claim:

1. In an automotive vehicle, in combination:
   a. an elongated vehicle chassis extending generally in the direction of travel of the vehicle and provided with motive means for driving same;
   b. two pair of wheels mounted on said chassis and supporting same, including at least one pair of driven wheels with respective axles;
   c. a drive train connecting said motive means with said axles and including:
      a differential located substantially along the vertical longitudinal median plane of said vehicle and said chassis for operatively connecting said axles with said motive means; and
      a rigid axle housing enclosing said axles and formed with a differential housing enclosing said differential whereby said housings are movable in unison relative to said chassis;
   d. first spring suspension means disposed symmetrically on opposite sides of said plane and of said differential housing for resiliently supporting said chassis on said housing; and
   e. a body-level-adjusting device disposed along said plane between said differential housing and said chassis, and comprising:
      second spring suspension means providing substantially 25 percent to 40 percent of the suspension force exerted by said spring suspension means, said second spring suspension means being formed by a compression-type coil spring compressible upon loading of the vehicle;
      a pair of spring seats bearing axially upon and retaining said spring between them for selectively stressing said spring;
      a hydraulic-fluid reservoir secured to one of said seats;
      hydraulic body-lifting means connected with the other of said seats and actuatable with hydraulic fluid to stress said spring and raise said chassis upon loading of the vehicle;
      pump means between said members actuatable upon relative oscillation of said members for displacing hydraulic fluid from said reservoir into said hydraulic body-lifting means; and
      position-control means between said members operable upon said body member being raised above a predetermined level for draining hydraulic fluid from said body-lifting means.

2. The combination defined in claim 1 wherein said housing form a rigid rear-axle assembly, said combination further comprising:
   a. support means swingably mounting said rear-axle assembly upon said chassis, said first spring suspension means including a pair of coil compression springs disposed symmetrically on opposite sides of said differential housing; and
   b. shock absorber means for damping the oscillations of said assembly and said chassis independently of said device.